Dec. 22, 1942.    J. E. ROLLO    2,306,084
EXTENSIBLE AND RETRACTABLE VEHICLE
Filed March 1, 1941    3 Sheets-Sheet 1

INVENTOR.
John E. Rollo
BY
ATTORNEY.

Dec. 22, 1942.  J. E. ROLLO  2,306,084
EXTENSIBLE AND RETRACTABLE VEHICLE
Filed March 1, 1941  3 Sheets-Sheet 2
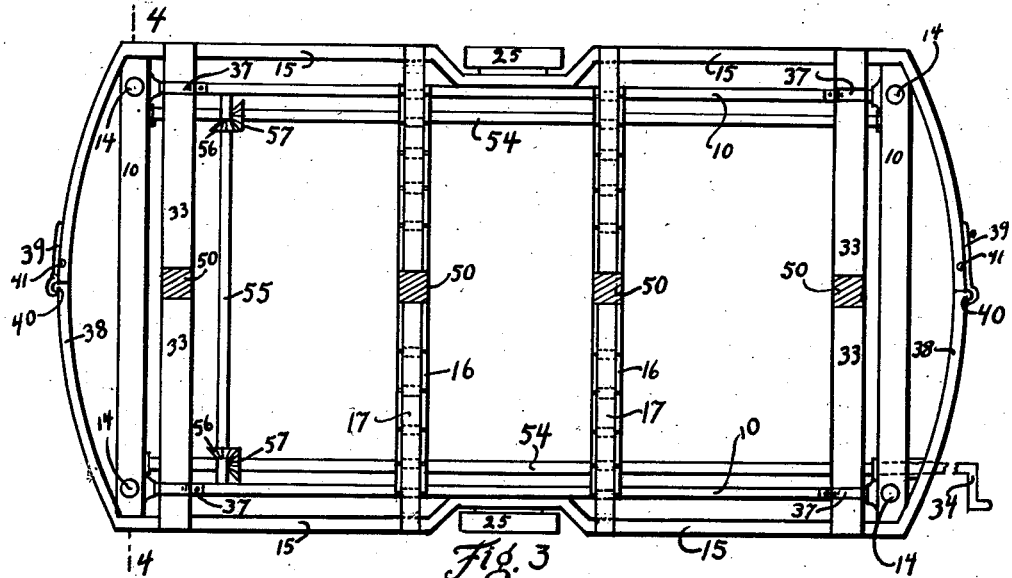
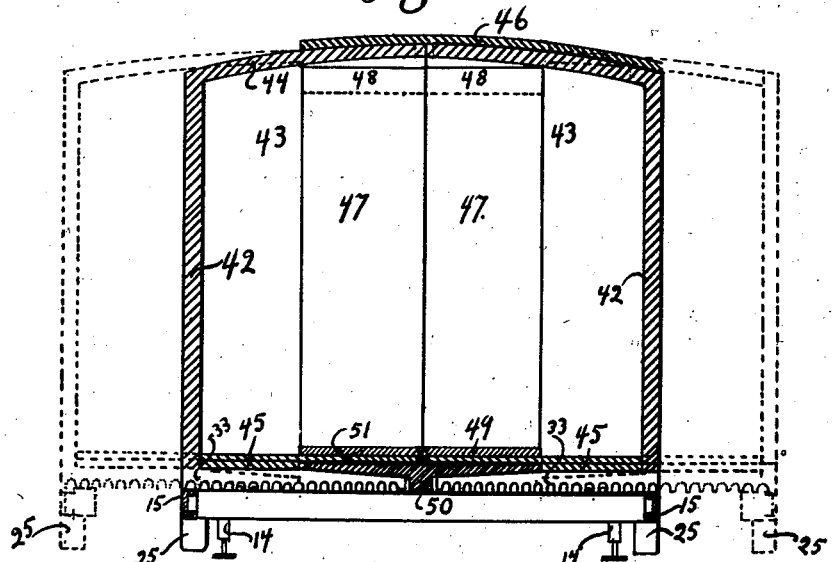
INVENTOR.
John E. Rollo
BY
ATTORNEY.

Dec. 22, 1942.    J. E. ROLLO    2,306,084
EXTENSIBLE AND RETRACTABLE VEHICLE
Filed March 1, 1941    3 Sheets-Sheet 3
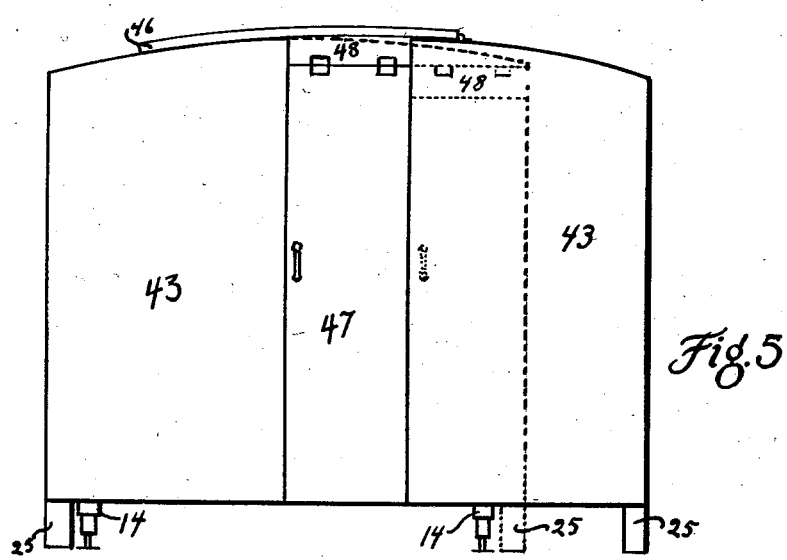
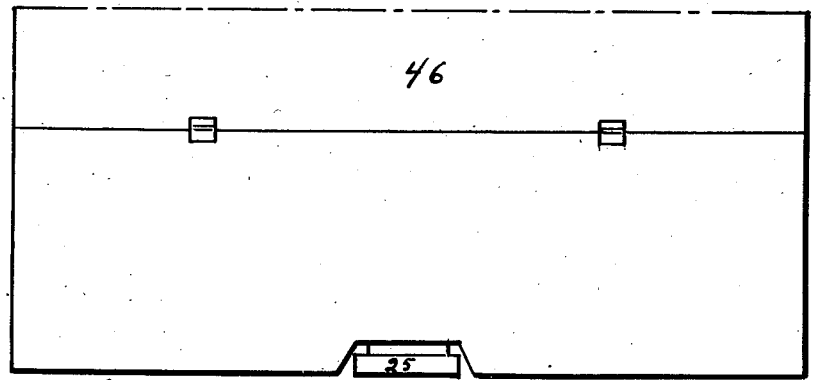
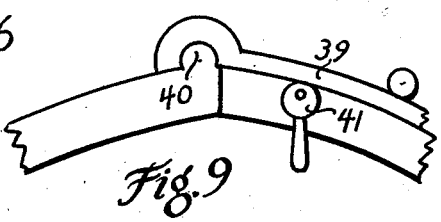
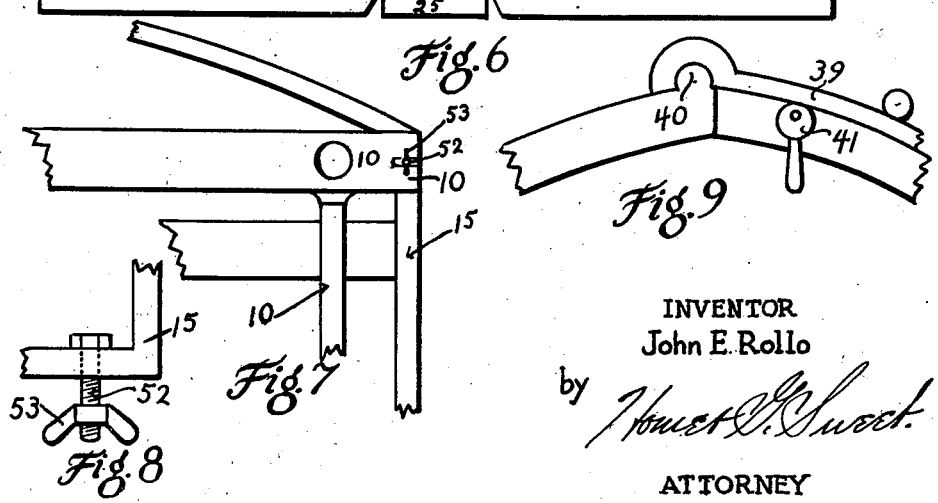
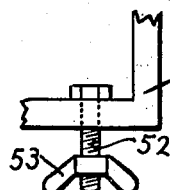
INVENTOR
John E. Rollo
by
ATTORNEY Patented Dec. 22, 1942

2,306,084

UNITED STATES PATENT OFFICE 2,306,084

EXTENSIBLE AND RETRACTABLE VEHICLE

John E. Rollo, Denver, Colo.

Application March 1, 1941, Serial No. 381,288

4 Claims. (Cl. 296—23)

This invention relates to vehicles of a type wherein the body enclosure is arranged for selective lateral expansion and contraction, and has as an object to provide an improved construction and arrangement of elements constituting such a vehicle.

A further object of the invention is to provide an improved construction and arrangement of elements constituting a vehicle selectively adjustable to a minimum width adapted for transit purposes or alternatively to a maximum width for enlargement of the vehicle body interior when the unit is at rest.

A further object of the invention is to provide an improved vehicle unit, preferably of trailer type, whereof the body portion is laterally expansible and contractible to adapt the unit for convenient and efficient use as a dwelling, workshop, office, and the like, when at rest.

A further object of the invention is to provide an improved combination of an independently-supportable frame with laterally-adjustable, wheeled enclosure units to form a vehicle.

A further object of the invention is to provide improved means for operatively mounting and supporting laterally adjustable, wheeled, body enclosure units cooperating to complete a vehicle.

A further object of the invention is to provide an improved vehicle trailer including a laterally-extensible body portion adapted for wheel support in a minimum lateral extent for transit purposes, and arranged for immobilized support in its maximum lateral extent for use as a dwelling, work-shop, and the like.

My invention consists in the construction, arrangement, and combination of elements, hereinafter set forth, pointed out in my claims, and illustrated by the accompanying drawings, in which—

Figure 1:
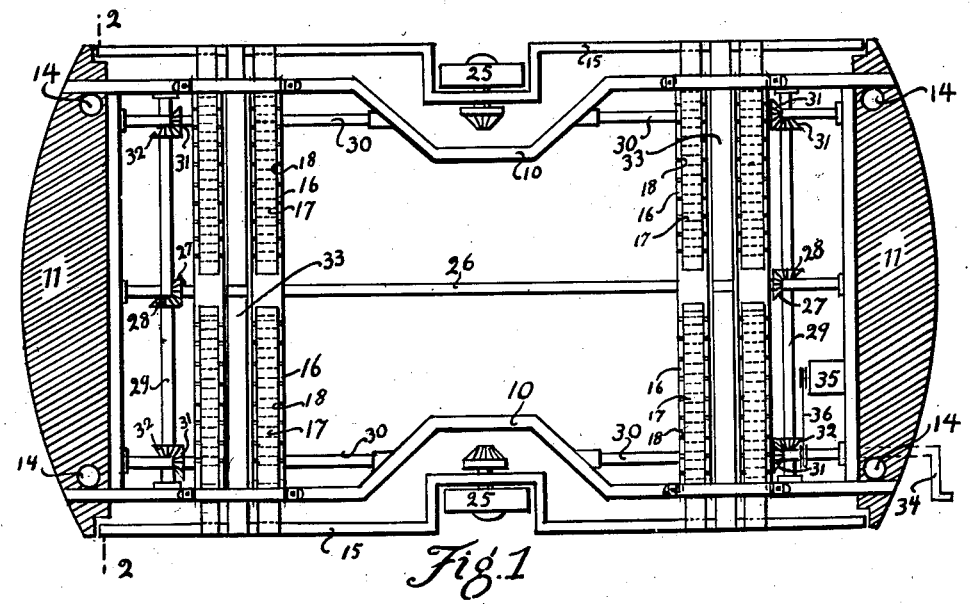

Figure 1 is a diagrammatic, plan view of the frame elements and connections employed in one embodiment of the invention, structural detail not essential to an understanding of the operative principle of the invention being omitted.

Figure 2:
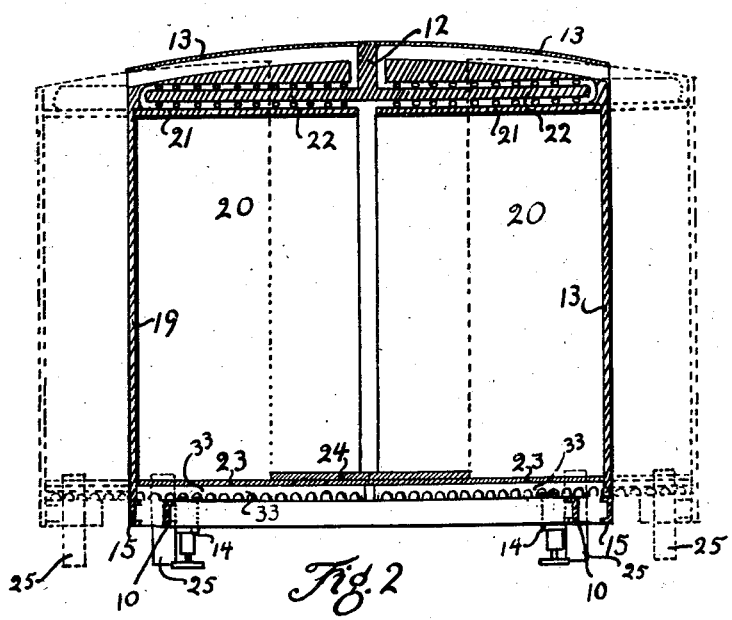

Figure 2 is a cross section of the complete unit constructed according to the showing of Figure 1 and taken on substantially the indicated line 2—2 of said latter figure. Figure 3 is a view similar to Figure 1 and illustrating a modified construction wherethrough the invention may be given effect. Figure 4 is a cross section of the complete unit constructed according to the showing of Figure 3 and taken on substantially the indicated line 4—4 of said latter figure. Figure 5 is an end view of a vehicle unit constructed in accordance with the showing of Figures 3 and 4 and illustrating said unit in partially-extended position. Figure 6 is a half plan view of the roof construction employed in the embodiment of the invention shown in Figure 5. Figure 7 is a fragmentary, detail view of cooperating frame means and connections advantageously employed in the embodiment of the invention according to Figure 3. Figure 8 is a fragmentary, detail view of typical clamp means employable with the embodiment of the invention shown in Figure 3 to interconnect relatively movable elements of the construction for transit purposes. Figure 9 is a fragmentary, detail view of typical latch means employable in the embodiment of the invention shown in Figure 3.

In the construction of the improvement as shown in Figures 1 and 2, the numeral 10 designates a rigid, substantially rectangular, vehicle chassis frame formed of structural members and elements interconnected in any specifically desired arrangement suitable to the purpose and function of the frame assembly. Vehicle body end closure sections 11 are fixed to and rise in parallel relation perpendicularly from the opposite ends of the frame 10, and are rigidly interconnected at their upper ends by a suitable beam or equivalent structure 12 which is preferably disposed above the longitudinal median line of the frame 10 and in parallel relation with the plane of said frame. A suitable roof or top closure 13 is secured to and supported by the beam 12 and upper ends of the sections 11 to complete the framing of a body enclosure. The members 11, 12, and 13 are permanently and rigidly interconnected and associated with the frame 10 and define a partial housing or enclosure carried by and above said frame, whereof the opposite sides are open. In fixed relation with the frame 10 or the end sections 11 associated therewith, and adjacent each corner of said frame, an extensible jack assembly 14 is disposed for actuation of its extensible elements perpendicularly to the plane of said frame and from the side of said frame opposite to that covered by the body superstructure, the jack assemblies 14 thus cooperating to provide vertically-adjustable, ground-engaging means for the immobilized support of the frame 10 and associated structure. The jack assemblies 14 may be of any specific type and construction suitable to their purpose, and may be mechanical, hydraulic, or pneumatic in type and arranged for either individual or simultaneous actuation, the construction shown in the drawings being but representative of agencies suitable for the purpose set forth and in no sense limitative.

Adjacent and exteriorly of the long side margins of the frame 10, side closure frame elements 15 are positioned and mounted for adjustment laterally toward and away from said frame 10, any specific construction and arrangement of means being employable to so position and operatively mount the frame members 15, a typical and operative arrangement being indicated in Figure 1 as comprising track members 16 fixed in suitable number and parallel, spaced relation transversely of the frame 10 for engagement by and sliding support of bearing arms 17 fixed to and extending inwardly from the members 15 in overlying relation with said tracks 16, friction-minimizing rollers 18 preferably being provided in operative relation intermediate the tracks 16 and arms 17. Each frame member 15 supports a body side closure assembly fixedly carried thereby and for travel therewith, such side closure assembly being diagrammatically illustrated as comprising a vertical outer wall panel 19 adapted to close between cooperating margins of the end sections 11 with a vertical extent slightly less than is required to bridge between its frame member 15 and the corresponding outer margin of the roof 13, opposite end members 20 fixed to and in perpendicular relation with the side panel 19 and adapted to fit just within and slide relative to inner surfaces of the fixed end sections 11, and a ceiling structure 21 disposed in slightly spaced relation beneath the roof 13 in fixed, perpendicular relation with the side and end panels 19 and 20, and arranged for slidable engagement with a guide bar 22 projecting laterally from and in fixed relation with the beam 12, the specific form and construction of the ceiling structure 21 being such as to facilitate its cooperation with and as an extension of the fixed roof 13 when the side closure assembly is extended laterally of the frame 10 and body superstructure to the positions indicated by broken lines in Figure 2. The body enclosure may be completed by floor panels 23 fixed to and movable with the side closure assemblies in slidable, cooperating relation with a fixed floor portion 24 supported by the frame 10 and disposed centrally of the latter in closing relation between the end sections 11.

The frame and body assembly above described is mounted for use as a vehicle on wheels 25 operatively associated with and rotatably carried by the frame elements 15 in any suitable specific number and arrangement. When the invention is developed in the form of a trailer unit, as shown in the drawings, a pair of wheels 25 may be mounted for rotation about a common axis transversely and substantially centrally of the frame portion of the unit, each of said wheels being carried by and operatively associated with one of the frame elements 15 in the manner illustrated, maximum useable width in the body enclosure being obtained by disposition of the wheels 25 in recesses formed by offsetting midportions of the frame elements 15.

Various specific constructions and arrangements of means may be utilized for the extension and retraction of the movable side closure assemblies relative to the rigid frame 10, one arrangement suitable for such purpose and adapted for either manual or power actuation being illustrated as comprising a shaft 26 disposed for rotation in and extending longitudinally and centrally of the frame 10 and provided with bevel gears 27 in meshing relation with bevel gears 28 carried by jack shafts 29 disposed transversely and adjacent the opposite ends of the frame 10. Actuating shafts 30 are journaled for rotation in the frame 10 in parallel relation with the shaft 26 and adjacent outer side elements of said frame, which shafts 30 are provided with bevel gears 31 in meshing relation with bevel gears 32 fixed adjacent opposite ends of the shafts 29, so that rotation of the shaft 26 is transmitted through the shafts 29 to effect simultaneous rotation of the shafts 30, the arrangement of gears being such as to rotate the shafts 30 adjacent the opposite sides of the frame 10 in opposite directions. A rack bar 33 extends in fixed perpendicular relation inwardly of the assembly from each end portion of each frame element 15 to overlie a shaft element 30, and a suitable pinion is fixed to each of the shafts 30 in position to engage with the corresponding rack bar 33 for linear travel of the latter and consequent extension or retraction of the side closure assemblies as the shafts 30 are caused to rotate. As is indicated in Figure 1, one of the shafts 30 may be extended beyond an end of the assembly for engagement by a crank 34 wherethrough the shaft arrangement may be actuated to extend or retract the side closure assemblies according to the direction of crank rotation; power means for such purpose being alternatively illustrated in the form of a suitable motor or prime mover 35 carried by the frame 10 and operatively connected as at 36, to rotate one of the shaft elements for consequent actuation of the entire shaft arrangement. Any suitable stop means may be employed to limit separation of the side closure assemblies laterally of the frame 10, and suitable means, such as yokes 37 rising from side margins of the frame 10 in embracing relation over the bearing arms 17, may be employed to prevent separation of said frame and side closure assemblies in a vertical direction.

The mobile unit constructed as shown and described provides a wheeled enclosure available for transport in a minimum width adapted for use on conventional highways in compliance with limiting regulations, the side closure assemblies being retracted to the position shown in full lines in Figures 1 and 2, and suitably locked in such position, and the jack assemblies 14 being retracted to permit ground engagement by the wheels 25 when the unit is to function as a vehicle. When the unit has been moved to a location where it is to be left for a time and utilized as a domicile, work-shop, office, store house, or the like, the jack assemblies 14 are actuated for extension into ground engagement sufficiently to lift the wheels 25 away from the ground, the jacks then serving as an immobile support for the frame 10 and enclosure carried thereby. Subsequently, the shaft arrangement is actuated to extend the side enclosure assemblies laterally and oppositely of the frame 10 to the positions shown in broken lines in Figure 2, the slidable cooperating elements of the roof, end panel, and floor constructions preserving the enclosure as a substantially weather-tight unit adapted for various purposes.

The embodiment of the invention illustrated in Figures 3 to 9, inclusive, is in purpose and principle substantially the same as that hereinabove described, and differs only in that the body enclosure is separable along its longitudinal medium vertical plane for lateral extension and includes no enclosure members or elements in fixed relation with the frame 10. In the alternative embodiment, the rigid, rectangular frame 10 is employed as previously described and is provided with the jack assemblies 14 adjacent its corners in the manner and for the purpose previously set forth, said frame carrying the track members 16 fixed transversely thereof for slidable engagement by and support of bearing arms 17 fixed to and extending at right angles inwardly from the body frame elements 15 in an arrangement equivalent to that first described. The frame elements 15 carry wheels 25 and rack bars 33 slidably engaging through hold-down yokes 37 rising from side margins of the frame 10 in substantial functional and structural equivalency with the corresponding arrangement of the embodiment first described, and the frame 10 is provided with an arrangement of simultaneously rotatable shaft elements for the actuation of pinions engaging the rack bars 33 for selective linear actuation thereof.

In the alternative embodiment of the invention, frame end segments 38 are rigidly secured to opposite ends of the frame members 15 and extend laterally of the frame assembly to abut on the longitudinal median line of said assembly when the members 15 are retracted to minimum lateral width of the frame formed thereby, suitable latching means, such as a spring hook 39 fixed to one of the frame segments 38 for engagement of its hook portion over a boss 40 projecting from the complementary segment 38, being provided to latch the segments 38 in abutting relation and against separation, suitable means, such as a manually-operative cam lever 41, being provided to facilitate release of each hook 39 from latched engagement over its boss 40 when it is desired to laterally expand the separable frame members. The frame side members 15 and end segments 38 support a body enclosure arranged for lateral separation along its longitudinal median line, each half of said body enclosure comprising a side panel 42 rising in fixed relation vertically from its frame member 15, end panels 43 supported by the frame segments 38 in fixed closing relation with end margins of the corresponding side panel 42 and disposed to abut for completion of a body end closure, roof sections 44 bridging between upper ends of each side panel 42 and associated end panels 43 for abutting engagement of their inner, adjacent margins along the longitudinal median line of the assembly, and floor panels 45 bridging between lower portions of each side panel 42 and end panels 43 for abutting engagement of their inner long margins. The body enclosure thus formed consists of a pair of complementary shells disposed in opposition and for abutting cooperation of their open side defining margins to complete the enclosure when their supporting frame members are retracted to a position of minimum frame width, and separable on the longitudinal, median, vertical plane of the assembly when said frame elements are moved laterally and oppositely to a position of maximum frame width. To cover the line of separation between the roof panels 44 and to bridge the gap therebetween when the body enclosure is laterally extended, a supplementary roof panel 46 is hinged at one longitudinal margin to the exterior surface of one of the panels 44 and closely and slidably overlies the other of the roof panels 44 with a lateral extent sufficient to provide an overlap on the slidably related roof panel 44 when the body enclosure is fully extended, suitable means, not shown, being preferably provided in the form of spring hinges, or the like, to maintain the supplementary panel 46 in close engagement with its slidably-related panel 44. Since lateral extension of the body enclosure is productive of separation between the adjacent margins of the end panels 43, wing panels 47 are hinged to and interiorly of the separable margins of the panels 43 and normally lie smoothly against inner surfaces of the fixed panels 43 in position to be swung about their hinge mountings and into extension-forming, coplanar relation with said fixed panels to cooperate in closing the gap therebetween when the body enclosure is fully extended, each of said wing panels 47 preferably having a width equal to one-half the distance between the separated margins of the panels 33 and being provided with a hingedly-related flap 48 on its upper end arranged to be swung upwardly and into closing cooperation against the underside of the supplementary roof panel 46. Similarly, the gap between adjacent margins of the floor sections 45 may be closed by supplementary panel members 49 which are hinged to the free margins of the sections 45 and normally overlie inner portions of said sections in position to be swung into gap-closing cooperation as extensions of the fixed floor sections, suitable supporting means, such as a beam 50 carried in fixed relation by the frame 10, being provided to engage under and support the floor sections 45 and supplementary floor panels 49. The beam 50 may be provided with laterally-extending, fixed arms 51 formed with upwardly and outwardly inclined lower surfaces against which correspondingly inclined upper surfaces of the rack bars 33 may slidingly engage to firmly hold said rack bars and their associated elements in the desired relationship when the enclosure is retracted to minimum width. Supplementing the latching engagement provided between adjacent ends of the frame end segments 38, outwardly-opening notches may be formed in corners of the frame 10 to each receive a threaded stud 52 fixedly carried by and in depending relation with a corresponding portion of the frame member 15, so that a wing nut 53 threadedly associated with each stud 52 may act to clamp said frame members 15 to the corners of the frame 10 when the assembly is retracted to minimum width.

The arrangement of means for expanding and retracting the alternative body construction illustrated in Figures 3 to 9, inclusive, is shown in Figure 3 as comprising a pair of shafts 54 rotatably mounted in spaced, parallel relation longitudinally of the frame 10 in underlying relation with the rack bars 33, one of said shafts being disposed adjacent the inner side of each of the long frame side members. Either or both of the shafts 54 may be arranged for engagement with a hand crank 34 whereby the engaged shaft may be rotated, or power means may be mounted on the frame 10 and engaged with and for rotation of one of said shafts 54 in the manner described in connection with Figure 1, rotation of either of said shafts 54 operating to effect simultaneous and opposite rotation of the other of said shafts through a jack shaft 55 disposed for rotation in the frame 10 transversely of the shafts 54 and carrying bevel gears 56 which mesh with complementary gears 57 fixed to the shafts 54. The shafts 54 carry pinions positioned to mesh with the rack bars 33 so that rotation of said shafts acts through said pinions to reciprocate said rack bars for extension or retraction of the body assemblies associated therewith according to the direction of shaft rotation.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. In a vehicle of the character described, a rigid, horizontally-disposed main frame, means carried by and extensible into ground engagement beneath said main frame for the immobilized support thereof at times, supplementary frame members exteriorly paralleling opposite sides of said main frame, ground-engageable wheels operatively carried by said supplementary frame members, slidable connections operatively engaging between said main frame and supplementary frame members for the support of either by the other in laterally adjustable relation, and slidably-cooperating, enclosure-completing sections carried by said main frame and supplementary frame members.

2. In a vehicle of the character described having a rigid, horizontally-disposed main frame and means carried by and extensible into ground engagement beneath said main frame for the immobilized support thereof at times, supplementary frame members exteriorly paralleling opposite sides of said main frame, wheels operatively carried by said supplementary frame members for ground engagement when said main frame is lowered, slidable connections operatively engaging between said main frame and supplementary frame members for the support of either by the other in laterally adjustable relation, and slidably-cooperating, enclosure-completing sections carried by said main frame and supplementary frame members.

3. In a vehicle having a rigid, horizontally-disposed main frame and jack means carried by and extensible into ground engagement beneath said main frame for the immobilized support thereof at times, supplementary frame members exteriorly paralleling opposite sides of said main frame, wheels operatively carried by said supplementary frame members for ground engagement when said jack means is retracted, means slidably connecting said supplementary frame members in laterally-adjustable relation with said main frame, said last means being operable to support said supplementary frame members on said main frame when said jack means is extended and to support said main frame on said supplementary frame members when said jack means is retracted, and slidably-cooperating, enclosure-completing sections carried by said main frame and supplementary frame members.

4. In a vehicle of the character described having a rigid, horizontally-disposed main frame and jack means carried by and extensible into ground engagement beneath said main frame for the immobilized support thereof at times, supplementary frame members exteriorly paralleling opposite sides of said main frame, wheels operatively carried by said supplementary frame members for ground engagement when said jack means is retracted, slide bearings transversely of said main frame, arms extending inwardly from said supplementary frame members for engagement with said slide bearings, whereby said members are mounted for adjustment laterally of said main frame, means for limiting vertical displacement between said arms and slide bearings, whereby said main frame and supplementary frame members cooperate for mutual support irrespective of the relative extension of said jack means, and slidably-cooperating, enclosure-completing sections carried by said main frame and supplementary frame members.

JOHN E. ROLLO.